(12) United States Patent
Love et al.

(10) Patent No.: US 9,342,104 B2
(45) Date of Patent: May 17, 2016

(54) DEVICE ACCESSORY BAY

(71) Applicants: Lenovo (Singapore) Pte. Ltd., Singapore (SG); VeriFone Systems, Inc., San Jose, CA (US)

(72) Inventors: Sharon Love, Durham, NC (US); Vincent A. Steffano, El Dorado Hills, CA (US); Dennis Jacobus Mos, San Diego, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 240 days.

(21) Appl. No.: 13/925,536

(22) Filed: Jun. 24, 2013

(65) Prior Publication Data

US 2014/0376172 A1    Dec. 25, 2014

(51) Int. Cl.
*G06F 1/16*    (2006.01)

(52) U.S. Cl.
CPC .......... *G06F 1/1632* (2013.01); *Y10T 29/49117* (2015.01)

(58) Field of Classification Search
CPC ........................ G06F 1/1632; Y10T 29/49117
USPC .................. 361/679.1, 679.2, 679.4, 679.41, 361/679.43, 976.45
See application file for complete search history.

(56) References Cited

U.S. PATENT DOCUMENTS

| | | | |
|---|---|---|---|
| 8,523,068 B2* | 9/2013 | Hsu et al. ...................... | 235/383 |
| 8,867,202 B2* | 10/2014 | Williams ................. | 361/679.41 |
| 2012/0045932 A1* | 2/2012 | Carnevali ...................... | 439/552 |
| 2014/0355200 A1* | 12/2014 | Thiers ...................... | 361/679.41 |
| 2014/0361995 A1* | 12/2014 | Halim et al. ................... | 345/173 |

* cited by examiner

*Primary Examiner* — Bernard Rojas
(74) *Attorney, Agent, or Firm* — Ference & Associates LLC (57) ABSTRACT

An embodiment a device, including: a device sleeve comprising a plurality of ends, each of the plurality of ends terminating in a lip portion configured to fit a screen bezel of an information handling device; the device sleeve including an accessory bay having one or more attachment mechanisms disposed therein, the one or more attachment mechanisms acting to reversibly secure an attachment portion of an accessory; and an element disposed in the device sleeve and positioned to communicate one or more of power and data with the information handling device. Other aspects are described and claimed.

20 Claims, 8 Drawing Sheets

DEVICE ACCESSORY BAY

BACKGROUND

Information handling devices such as slate or tablet mobile computing devices and other mobile personal computing devices (hereinafter "devices") are used in many contexts. Slate devices tend to be flat in shape and relatively featureless devices that lack a permanent physical keyboard. Such devices are intended to be compact, lightweight, and highly mobile. Such devices can be made in a variety of screen sizes, thicknesses, and provide a variety of port layouts. With slate-style devices increasingly becoming primary computing devices for a variety of users, the need for peripherals and accessories is increasing. Unfortunately, such mobile form factors do not easily accommodate attachment of external devices.

BRIEF SUMMARY

In summary, one aspect provides a device, comprising: a device sleeve comprising a plurality of ends, each of the plurality of ends terminating in a lip portion configured to fit a screen bezel of an information handling device; the device sleeve including an accessory bay having one or more attachment mechanisms disposed therein, the one or more attachment mechanisms acting to reversibly secure an attachment portion of an accessory; and an element disposed in the device sleeve and positioned to communicate one or more of power and data with the information handling device.

Another aspect provides a device, comprising: a base component comprising an accessory bay; the accessory bay including one or more attachment mechanisms disposed therein, the one or more attachment mechanisms acting to reversibly secure an attachment portion of an accessory; the accessory bay comprising a first element disposed therein and positioned to communicate one or more of power and data with an accessory attached via the one or more attachment mechanisms; wherein the one or more one or more attachment mechanisms comprise an industry standard pattern conforming to a video electronics standards association mount format.

A further aspect provides a method, comprising: forming a device sleeve comprising a plurality of ends, each of the plurality of ends terminating in a lip portion configured to fit a screen bezel of an information handling device; forming an accessory bay in the device sleeve having one or more attachment mechanisms disposed therein, the one or more attachment mechanisms acting to reversibly secure an attachment portion of an accessory; and disposing in the device sleeve an element positioned to communicate one or more of power and data with the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The illustrated example embodiments will be best understood by reference to the figures. The following description is intended only by way of example, and simply illustrates certain example embodiments.

In this description, "information handling device" or simply "device" is used to refer to devices that include but are not necessarily limited to tablet or slate computing devices, smart phones, e-readers, monitors, kiosks or portions thereof, and any other device that may be inserted or otherwise housed in a device sleeve, as described herein according to the various example embodiments. Moreover, examples are illustrated throughout in which a device sleeve contains an accessory bay according to certain example embodiments. It should be noted, however, that an accessory bay according to other embodiments may be provided in different contexts, e.g., integral to a device housing such as the housing of a tablet computing device.

Figure 1:
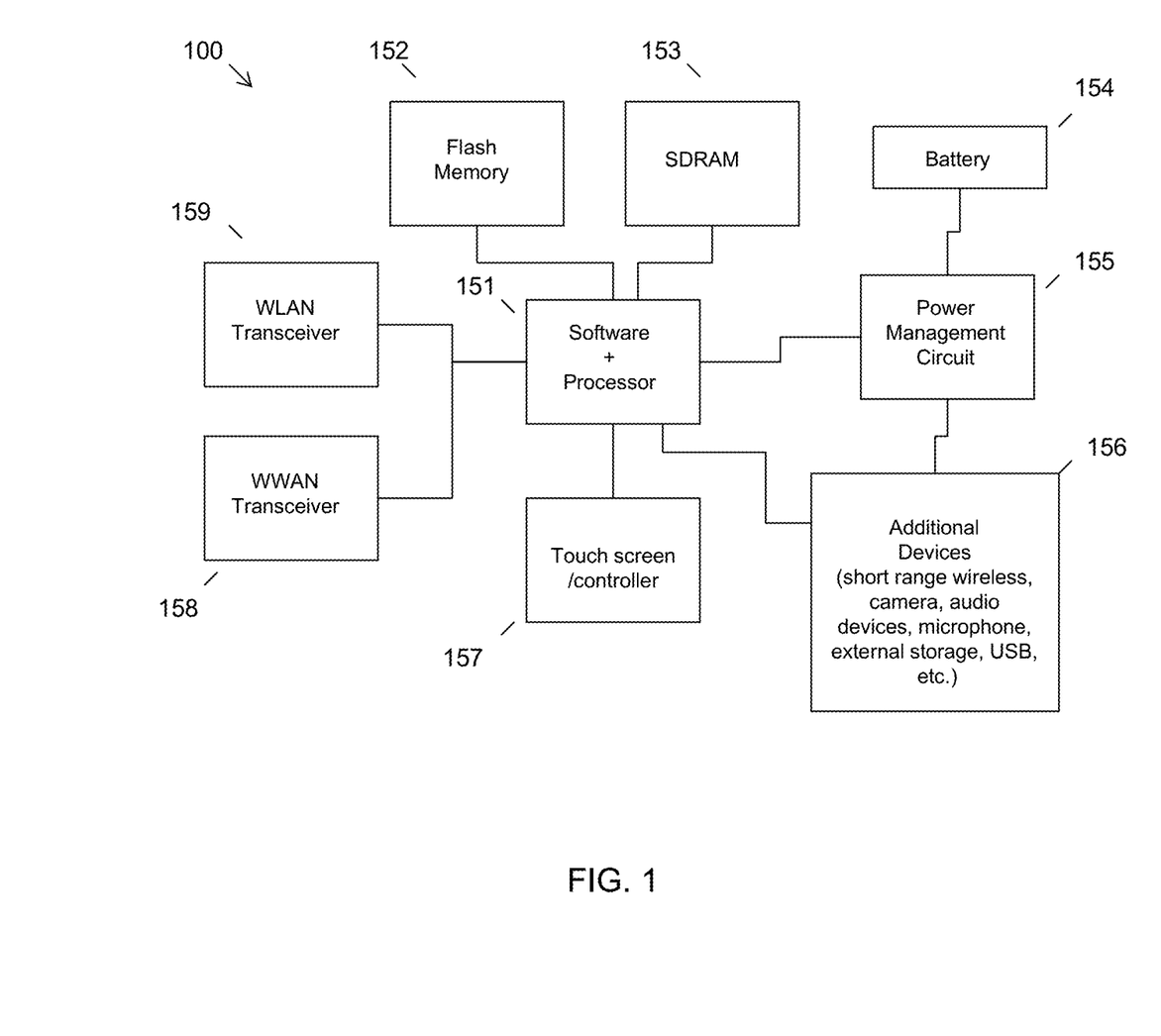
FIG. 1 illustrates an example of information handling device circuitry.

Referring to FIG. 1, while various other circuits, circuitry or components may be utilized in information handling devices, with regard to slate and/or tablet circuitry, an example device 100 illustrated in FIG. 1 includes an ATOM based system (system on a chip) design, with software and processor(s) combined in a single chip 151. Internal busses and the like depend on different vendors, but essentially all the peripheral devices 156 may attach to a single chip 151. The device 100 circuitry may combine the processor, memory control, and I/O controller hub all into a single chip 151. Also, ATOM based systems 100 do not typically use SATA or PCI or LPC. Common interfaces for example include SDIO and I2C.

There are power management chip(s) 155, e.g., a battery management unit, BMU, which manage power as supplied for example via a rechargeable battery 154, which may be recharged by a connection to a power source (not shown). In at least one design, a single chip, such as 151, is used to supply BIOS like functionality and DRAM memory.

Such systems 100 typically include one or more of a WWAN transceiver 158 and a WLAN transceiver 159 for connecting to various networks, such as telecommunications networks and wireless base stations. Commonly, system 100 will include a touch screen 157 for data input and display. System 100 also may include various memory devices, for example flash memory 152 and SDRAM 153.

System 100 may include communications ports for additional devices 156 such as USB or other peripheral devices. Commonly systems such as system 100 will include multiple such connections for external peripherals in an attempt to accommodate a wide variety of use cases.

For example, as slate and tablet devices such as outlined in FIG. 1 are becoming a popular choice as a main device, e.g., replacing laptop or desktop computing devices, users attempt to utilize a wide variety of external peripherals with tablet or slate form factors. Users find that use of external peripheral devices, originally designed for notebook or desktop PCs, may be acceptable while the tablet or slate is rested on a flat surface (e.g., a tablet or a desk), but also discover that such external peripheral devices do not travel easily or allow for use while mobile.

Moreover, specialized external peripherals designed for use with a single device are quite common. While such external peripherals or accessories can be more easily attached and carried with a slate or tablet device, they typically can only be used with a single model of the slate or tablet device. Such custom external peripherals cannot be easily used with other devices. This means that the useful lives of such external peripherals end when the particular slate or tablet device is no longer used, even if the external peripherals are still completely functional. Such external peripherals are usually relatively expensive, as the cost of design has to be amortized across fewer devices due to their relatively short useful life and limited application.

With the priority placed on compact, lightweight designs for mobile devices such as slates and tablets, it is not practical for manufacturers to standardize design of slates. Even when screen size remains the same, advancing technology allows for reduced "z" dimension (thickness), smaller "x" and "y" dimensions (length and height) with narrower bezels, and subtle changes to the exterior shape, such as changes in slopes and curves of the information handling device's housing. Optimal device design from one generation to the next also changes the physical placement of communication ports to which external peripherals attach.

Sleeves or cases are conventionally designed specifically for each slate device. As such, conventional sleeves only accommodate a single external peripheral device attachment. The external peripheral usually must be designed to accommodate a slate-specific connection point or communication port, with smaller external peripherals poorly accommodated and only one external peripheral allowed at a time. This approach also adds undue weight and cost to the device while not solving the problem of device specific external peripherals.

Accordingly, an embodiment provides an accessory bay. An accessory bay is configured to provide for attachment of a variety of accessories, e.g., external peripheral devices. In an embodiment, a device is provided with an accessory bay that interfaces with one or more accessories, e.g., an external peripheral device or a layer component, e.g., a bracket, providing an interface or translation for connecting another accessory to the device having the accessory bay.

In one example, an embodiment includes a device sleeve that is based on a layered design such that it may accommodate a variety of external peripherals for attachment thereto. In one example, an embodiment provides a sleeve comprising a standard interface pattern for connection (e.g., a video electronics standards association (VESA) pattern of threaded screw inserts), a bracket attaching to the standard interface pattern, and an accessory or peripheral attaching to the bracket. The standard interface pattern may be attached to the slate or tablet device directly, e.g., an accessory bay is integrated into a slate or tablet housing directly, with the accessory bay including the standard pattern. The standard pattern may also be included as part of the sleeve rather than as part of the device, e.g., for a sleeve which attaches to a slate or tablet another way, e.g., via a clip-on arrangement. Moreover, a combination of the foregoing may be provided according to one or more embodiments.

A bracket, if included, may serve as a layer or interface structure between an external peripheral device and a standard interface pattern (e.g., included in a tablet or slate device and/or included in a device sleeve). Thus, a bracket may be included for example to translate between one pattern used by the sleeve and another pattern used by the external peripheral in question, or to translate between one pattern of an integrated accessory bay of a slate or tablet device and another pattern of an external peripheral device. The external peripheral device attachment to the bracket may vary per the needs of the external peripheral device and/or the particular use case encountered.

In contrast to the use of conventional external peripheral devices, an embodiment provides that an external peripheral may be used while mobile. Moreover, in contrast to the use of model-specific external peripherals, an embodiment provides for a single or set of standardized interface(s), which accommodate a variety of tablet device and external peripheral combinations.

In an embodiment, a device sleeve having a multi-layer construction is provided. In a non-limiting example embodiment the device sleeve comprises three layers. Use of three layers allows one bracket layer to interchangeably accommodate many external peripherals, as well as allows one pattern to accommodate many brackets. Moreover, one bracket may thus accommodate many tablet or slate devices, conversely one tablet device may be attached to many different brackets. A multi-layered construction also allows use of multiple external peripherals, via either multiple brackets or a single bracket exposing multiple attachment modes.

In an embodiment, the accessory bay also provides a component or attachment enabling fixed location use, such as with stands, mounts, or fixed location peripherals. For example, the device may be attached or fixed to a post or other standard device mount, e.g., with the device mount being attached as an external peripheral device. It should be noted that, while various embodiments are described throughout with respect to tablet or slate devices, an accessory bay (or component including an accessory bay, e.g., a device sleeve) may also be provided in non-slate or non-tablet devices, such as other information handling devices like mobile monitors, notebooks, or as a connection between two peripheral devices, e.g., a peripheral-to-peripheral connection.

Figure 2:
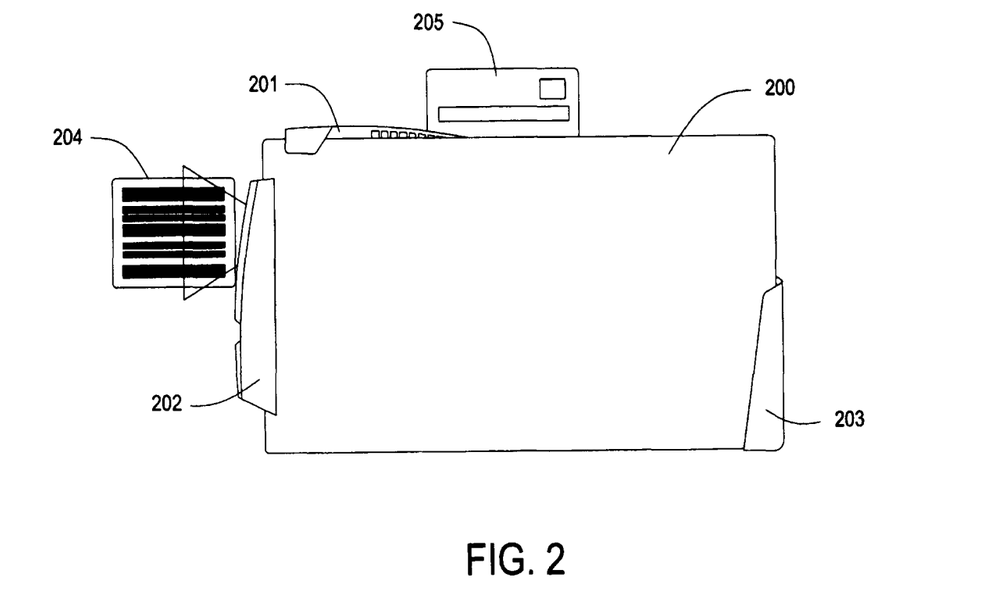
FIG. 2 illustrates a front view of an example device sleeve with a device housed therein.

In FIG. 2 an example device sleeve is illustrated in a front view. The device 200 inserted or housed within the device sleeve remains largely visible from the front (e.g., the portion of the device 200 including a touch screen display). This is provided by virtue of end portions 201, 202 and 203 of the device sleeve, each of which includes a minimal lip portion that attaches or wraps around the bezel of the device but does not appreciably occlude or block the touch screen. As further described throughout, in some examples the device sleeve includes integrated peripheral devices, such as a magnetic strip reader (card reader) for reading a card having a magnetic strip 205 and/or an optical reading device, e.g., for reading an optical code or pattern such as an optical bar code 204.

Figure 3:
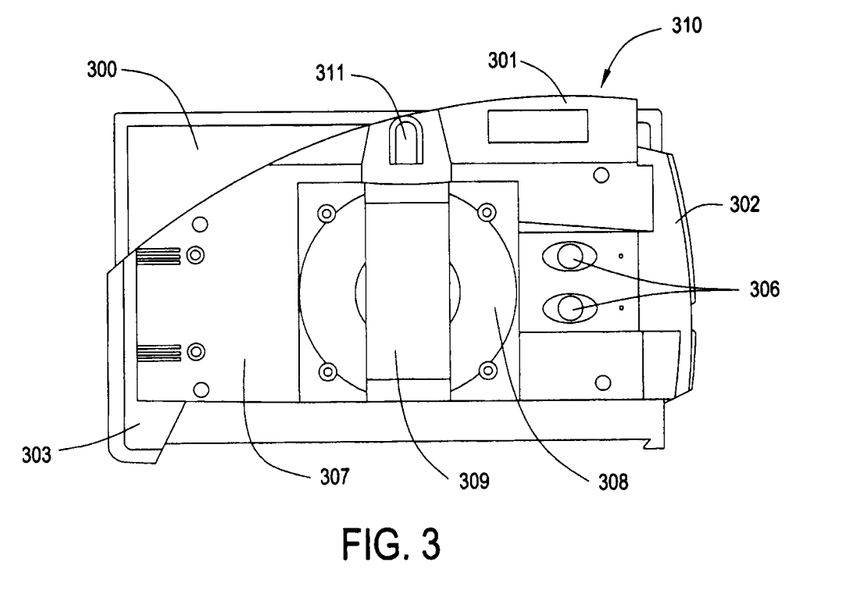
FIG. 3 illustrates a back view of an example device sleeve with a device housed therein.

In a back view, illustrated in FIG. 3, the example device sleeve 310 includes an accessory bay with a standard pattern for connecting to an accessory also having the standard pattern, e.g., external peripheral 308. The example device sleeve 310 illustrated includes ends 301, 302 and 303. Each of the ends 301, 302 and/or 303 may be integrated into the device sleeve 310, e.g., such as a single construction from a molded and flexible material. Therefore, if an integrated design is used, the device sleeve 310 may be formed of flexible material such that the one or more of the ends 301, 302 and/or 303 is simply flexed to allow insertion of the device 300. Alternatively or additionally, one or more of the ends 301, 302, and/or 303 may be formed in a releasable fashion, e.g., via use of an end attachment mechanism such that the ends may be removed, e.g., for device insertion or for accommodating various end portions other than the examples illustrated. Thus, various device ends may be accommodated by virtue of implementing a modular design for end portions that reversibly attach to a base component or portion 307, for example. In the example illustrated in FIG. 3, the device sleeve 310 has an approximate length of about 281 mm and an approximate height of about 174 mm, with the overall device sleeve 310 thickness about 33 mm.

The device sleeve 310 may include various device apertures. One example aperture 311 is illustrated in FIG. 3 and is positioned near the base component or portion 307 of the device sleeve such that, when the device 300 is housed within the device sleeve 310, the aperture 311 permits a camera of the device 300 to be used.

In the example of FIG. 3, the device sleeve 310 includes buttons 306, which may for example be located at one end of the base component or portion 307. These buttons 306, if included, may correspond to controls for one or more integrated peripherals, e.g., for example buttons 306 may be used to activate and/or control an optical bar code reader, if included with the device sleeve 310. While the location of the buttons 306 (two are illustrated by way of example, although more or less may be employed) may vary, one example location is, as illustrated in FIG. 3, proximate to a hand strap 309 of an external peripheral 308 inserted into the based component or portion 307. Therefore, using the example external peripheral 308 including a hand strap 309, when a user inserts his or her hand there-through, his or her fingers will be aligned with the buttons 306 for ease of use of the buttons 306 to control one or more integral peripheral devices.

As may be appreciated from the back view of the device sleeve 310, the ends 301, 302 and/or 303 may take a variety of forms. For example, a single end 303 may be directed to a device 300 corner, thus performing the function of two separate ends. It will be appreciated that to secure the device 300 within the device sleeve 310, the more ends (e.g., four) provided, the more secure the device 300 will be held within the device sleeve 310. However, fewer ends may be required depending on the materials chosen for the device sleeve 310 and/or ends 301, 302 and/or 303. For example, via selecting a material that imparts friction or resists slipping, it may be possible to use only two ends, e.g., 302 and 303, etc. Moreover, the various configurations of the ends 301, 302 and/or 303 may be modified to suit a variety of contexts such as accommodating access to underlying power and/or data ports of the device 300 or other devices, as further described herein.

Figures 4A, 4B, 4C:
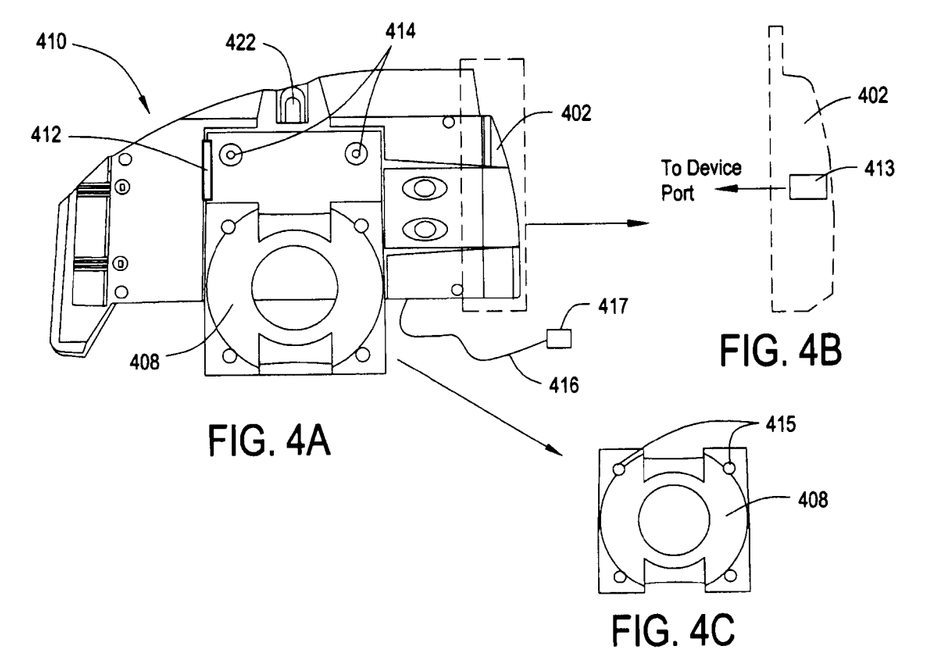
FIG. 4A illustrates a back view of an example device sleeve and a component partially removed therefrom.
FIG. 4B illustrates an example view of an internal component of a sub-portion of the example device sleeve of FIG. 4A.
FIG. 4C illustrates an example component.

The example external peripheral component 308 attached to the base component or portion 307 of the device sleeve 310 illustrates that different external peripheral components may be attached to the base component or portion 307. In the example of FIG. 4A, a peripheral component 408 (here, including a portion for a hand sleeve 309) is partially removed from the device sleeve 410. The device sleeve 410 includes one or more attachment mechanisms 414 for reversibly attaching an external peripheral component 408. Here, the example attachment mechanisms are illustrated in FIG. 4A as threaded inserts 414 formed in a VESA pattern within the device sleeve 410 into which screws of the external peripheral 408 may be inserted. While threaded inserts 414 for accommodating screws have been used as an illustrative example, other attachment mechanisms may be utilized, for example a clip in mechanism with a release (e.g., a push button release). Similarly, additional attachment points (e.g., multiple sets of attachment points of differing patterns) or modified attachment points (e.g., of varied placement) to accommodate attachment of different accessories, e.g., brackets.

By way of further elaboration, the external peripheral 408 of FIG. 4A is illustrated as a component providing a hand sleeve. As described herein, such a component (with or without the hand sleeve portion) may be included, e.g., with additional attachment mechanism, e.g., different patterns, so as to provide a translation function between attachment mechanism 414 of a base component (accessory bay) and the attachment mechanism of another external peripheral, e.g., a bracket may act to attach the device sleeve 410 and another external peripheral. For example, the external peripheral that attaches to a bracket or layer accessory may be an extra battery acting as an additional power supply to the information handling device (e.g., device 300). Moreover, the bracket component may be included along with an additional external peripheral, such as when the bracket component or a similar layer component is integrated into and/or supplied by an external peripheral device manufacturer. For example, an external peripheral may have its attachment portion formed in the shape of the bracket component such that an additional bracket component is unnecessary (i.e., the external peripheral attaches directly to the device sleeve 410 via attachment mechanism(s) 414).

As illustrated in FIG. 4C, the external peripheral 408 may include holes or apertures 415 therein corresponding to pattern of threaded inserts 414 of the device sleeve 410. This permits the external peripheral 408 (of whatever variety) to be attached to the device sleeve 410 via the accessory bay in a reversible fashion.

Illustrated in FIG. 4B is a portion of the device sleeve illustrated in FIG. 4A. In particular, FIG. 4B illustrates an end portion 402 of device sleeve 410 of FIG. 4A in a transparent view, i.e., permitting an internal element 413 to be viewed. The internal element 413 may comprise, for example, a power connector, a data connector, or a combined power and data connector. For example, element 413 may be a male USB connector. The element 413 is included such that it may provide connection to the information handling device, e.g., information handling device 300. Thus, the device sleeve 410 is able to transmit and/or receive data and/or power to/from an information handling device, e.g., device 300. The power and/or data connection may also be made directly to the device 300 using a standard port or using a port co-located with the accessory bay, e.g., element 412, as further described herein.

The power and/or data communicated to/from a device, e.g., device 300, may take a variety of forms. For example, the element 413 may be utilized to communicate information from the device sleeve 410 itself to an information handling device. This may take the form of communicating data, e.g., from an integrated peripheral device such as a magnetic strip reader or optical scanning device/reader to the information handling device.

Additionally or alternatively, the element 413 may be used to transmit/receive power and/or data between an information handling device and an external peripheral, e.g., external peripheral 408. In an embodiment where an accessory bay is included or integrated into a tablet or slate housing, a port for the element 413 may be provided integral thereto.

In a case where the external peripheral includes an additional power source in the form of a rechargeable battery, the external peripheral may transmit power to the information handling device via a connection 412 to the device sleeve 410 which is in turn connected to the element 413. The connection 412 may take a variety of forms (e.g., a standard power connector for a battery, a pogo pin arrangement, etc.). In an embodiment, a separate connection element 417 may be provided via an additional route, e.g., via a wired attachment 416. Therefore, an external peripheral 408 may be attached to the device sleeve 410 and communicate power and/or data via another connection, e.g., wire 416 and connection element 417. In an embodiment in which an accessory bay is integrated into a housing of a tablet or slate device, a power and/or data connector element, e.g., element 412, may be included in the accessory bay of the tablet or slate device. An accessory bay, e.g., as provided in a device sleeve 410, may accommodate multiple power and/or data connections (or combined power and data connections) for communicating power and/or data, e.g., between integrated peripherals of the device sleeve 410 and/or external peripherals 408 that are reversibly attachable to the accessory bay.

Figure 5A:
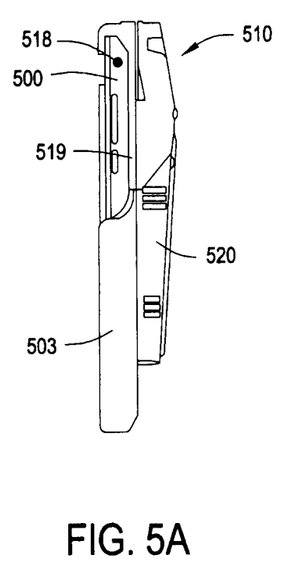
FIG. 5A illustrates a right view of an example device sleeve with a device housed therein.
Figure 5B:
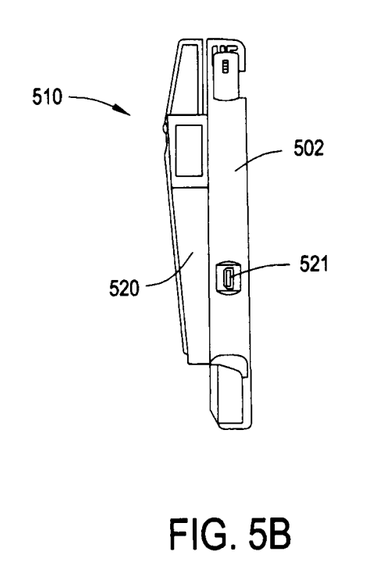
FIG. 5B illustrates a left view of an example device sleeve with a device housed therein.

FIG. 5A and FIG. 5B provide right and left views of an example device sleeve 510, respectively. In FIG. 5A-B, it may be appreciated that the ends, e.g., end 503, may be shaped to secure the device 500 within the device sleeve 510 as well as providing access to one or more device ports 518. This may be accomplished for example by limiting the extent of coverage of an end, e.g., end 503, such that it does not cover a device port, e.g., 518. Alternatively or additionally, an end, e.g., end 502, may include one or more apertures, e.g., aperture 521, such that a connecting element (e.g., power connector, not shown) may be inserted there-through.

As can be appreciated further from FIG. 5(A-B), the device sleeve 510 may include an inner surface 519 accommodating the back side of an information handling device and an outer surface 520. The outer surface 520, as in the example of FIG. 5(A-B) may be sloped, e.g., 10%, such that the device sleeve 510 acts to slope the device 500 held therein. This may be advantageous for certain use contexts, such as when the device 500 and device sleeve 510 are set on a tablet or surface. The sloped surface 520 of the device sleeve 510 will provide a slope to the device 500 housed therein such that it is more easily viewable and/or usable, e.g., for typing on the touch screen.

Figure 6A:
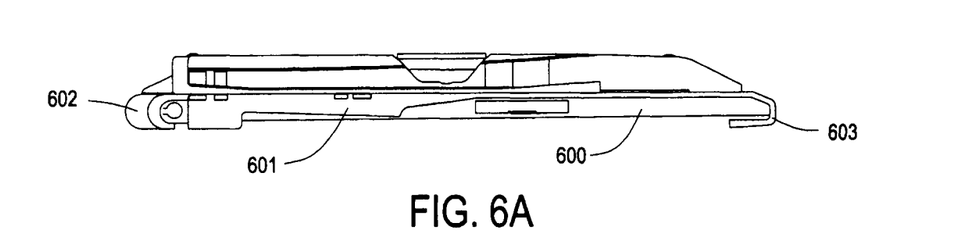
FIG. 6A illustrates a top view of an example device sleeve with a device housed therein.
Figure 6B:
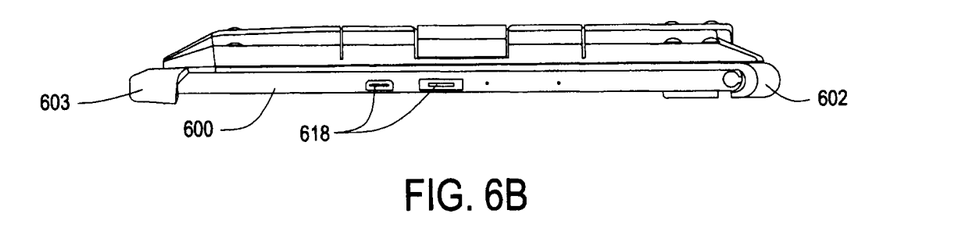
FIG. 6B illustrates a bottom view of an example device sleeve with a device housed therein.

Similarly, as illustrated in FIG. 6(A-B), various ends, e.g., ends 601, 602 and/or 603 of the device sleeve 610 may be configured such that adequate securing of the device 600 is had within the device sleeve 610 without encumbering underlying data and/or power ports, e.g., 618, of the device 600. As can also be appreciated from both FIG. 6(A-B) as well as FIG. 5(A-B), the device sleeve's profile may be chose such that it minimally affects the overall thickness or "z" dimension of the combination of the device 500/600 and device sleeve 510/610. In an example embodiment, the thickness profile of the device sleeve 610, inclusive of the device 600, is about 33 mm.

In this regard, an embodiment provides a device sleeve that minimally impacts the overall dimensions of the tablet (or like device) as well as minimally impacts its overall weight. As an example, a device sleeve may be formed from a light weight polymer such that the overall weight of the device sleeve does not appreciably impact the combined weight of the device and device sleeve. Thus, for use cases in which the user is using a device such as a tablet device in a mobile fashion for extended periods of time, the additional weight of the device sleeve minimally impacts the usability of the combination.

Figure 7:
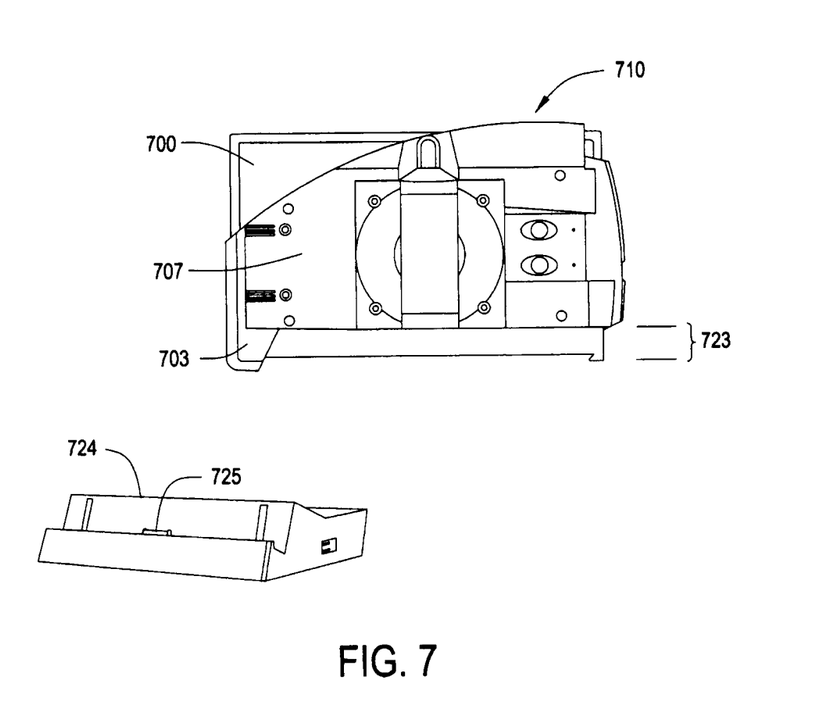
FIG. 7 illustrates a back view of an example device sleeve with a device housed therein and an example connectable device.

The device sleeve may further be configured such that it does not preclude use of an information handling device housed therein with other devices, over and above external peripheral devices connected to the device sleeve. For example, as illustrated in FIG. 7, an example device sleeve 710 is configured such that an end 703 occupies a corner of the device 700 such that device is secured within the device sleeve 710 but is not otherwise occluded by the end 703. Thus, end 703 terminates proximate to the corner of the device 700. Moreover, the end 703 is secured, e.g., via an attachment mechanism (e.g., screws) to the device sleeve 710 such that the distal portion of end 703 and a base component or portion 707 offers clearance 723 for a bottom of the device 700. This permits the device 700 to be inserted into, e.g., a docking station 724 and to be attached to a connection element 725 thereof while the device 700 remains housed in the device sleeve 710. Thus, device sleeve 710 may be designed such that the device 700 may be housed essentially permanently therein without precluding use of the device 700 with other devices over and above integrated peripherals or external peripherals attachable to the device sleeve 710.

Figure 8:
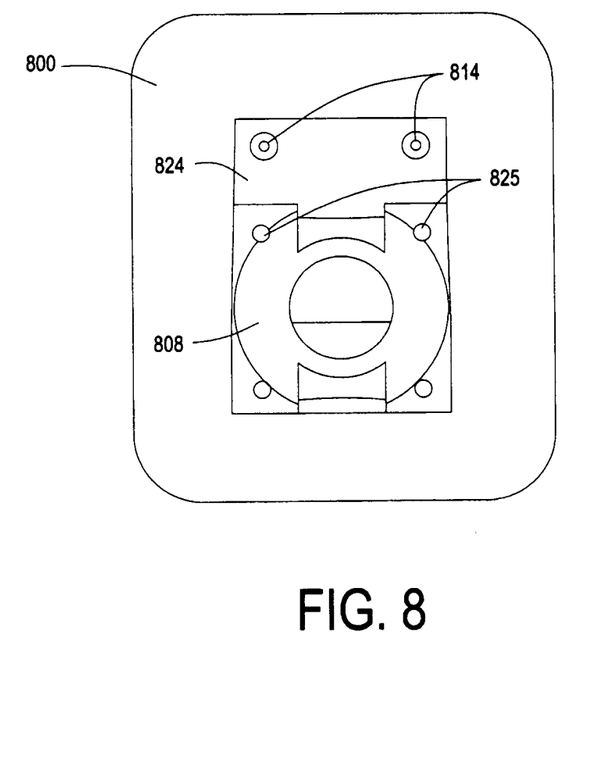
FIG. 8 illustrates an example information handling device having an accessory bay disposed therein.

Referring to FIG. 8, as described herein, according to an embodiment, rather than including an accessory bay 824 in a device sleeve, an accessory bay 824 may be integrated into a housing of an electronic device 800 such as a tablet or slated device. In the example illustrated in FIG. 8, an accessory bay 824 is included in a rear housing of a tablet device 800. The accessory bay 824 includes an attachment mechanism for attaching an accessory 808, here again illustrated as an external peripheral including a hand strap groove for inclusion of a hand strap.

The attachment mechanism in the example of FIG. 8 is a pattern of screw inserts 814 corresponding to holes 825 in the accessory 808. In the example of a layered accessory, additional attachment mechanisms, e.g., patterns or sets of patterns, e.g., for screws, may be included to translate between the attachment mechanism provided by the accessory bay 824 of the device 800 and the external peripheral attachment mechanism in question. Therefore, an additional layer component may be used in place of accessory 808 to attach to the tablet 800 and in turn attach to a different attachment mechanism pattern of an external peripheral device. As with the example embodiments described in connection with the example device sleeve, e.g., device sleeve 310, the accessory bay 824 of the device 800 may include additional features, e.g., power and/or data connectors for communicating with external peripheral devices.

It will also be understood that in some embodiments the device sleeve may include one or more processors and one or more memory devices in order to execute program instructions. For example, the device sleeve may include on board circuitry configured to process inputs and provide outputs to one or more of integral peripheral devices and external peripheral devices. Thus, the various embodiments may include device sleeves configured appropriately to execute program instructions consistent with the functionality of the embodiments as described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be any non-signal medium, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), a personal area network (PAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of an information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising:
   a device sleeve comprising a plurality of ends, each of the plurality of ends terminating in a lip portion configured to fit a screen bezel of an information handling device;
   the device sleeve including an accessory bay having one or more attachment mechanisms disposed therein, the one or more attachment mechanisms acting to reversibly secure an attachment portion of an accessory; and
   an element disposed in the device sleeve and positioned to communicate one or more of power and data with the information handling device;
   wherein the one or more attachment mechanisms of the accessory bay conform with a video electronics standards association mount format.

2. The device of claim 1, further comprising:
   another element disposed in the base component and positioned to communicate one or more of power and data with an accessory attached via the one or more attachment mechanisms.

3. The device of claim 1, wherein the device sleeve comprises one or more integrated peripheral devices;
   the one or more integrated peripheral devices communicating with the information handling device.

4. The device of claim 3, wherein the one or more integrated peripheral devices comprise an optical scanner and a magnetic strip reader.

5. The device of claim 4, wherein the one or more integrated peripheral devices communicate with the information handling device via a USB connector.

6. The device of claim 1, wherein the accessory comprises one or more of a mobile power source and a securing strap.

7. The device of claim 1, wherein the one or more attachment mechanisms comprise one or more threaded inserts for accommodating screws.

8. A device, comprising:
a base component comprising an accessory bay;
the accessory bay including one or more attachment mechanisms disposed therein, the one or more attachment mechanisms acting to reversibly secure an attachment portion of an accessory;
the accessory bay comprising a first element disposed therein and positioned to communicate one or more of power and data with an accessory attached via the one or more attachment mechanisms;
wherein the one or more one or more attachment mechanisms comprise an industry standard pattern conforming to a video electronics standards association mount format.

9. The device of claim 8, wherein the base component is a housing of an information handling device having the accessory bay disposed therein.

10. The device of claim 9, wherein the accessory comprises one or more of a mobile power source and a securing strap.

11. The device of claim 8, wherein the base component is included in a device sleeve attachable to an information handling device.

12. The device of claim 8, wherein the base component is included in a device sleeve attachable to an information handling device, and wherein the device sleeve comprises one or more integrated peripheral devices;
the one or more integrated peripheral devices communicating with the information handling device via a communication element.

13. The device of claim 12, wherein the one or more integrated peripheral devices comprise an optical scanner and a magnetic strip reader.

14. The device of claim 13, wherein the communication element comprises a USB connector.

15. The device of claim 8, wherein the one or more attachment mechanisms comprise one or more threaded inserts for accommodating screws.

16. A method, comprising:
forming a device sleeve comprising a plurality of ends, each of the plurality of ends terminating in a lip portion configured to fit a screen bezel of an information handling device;
forming an accessory bay in the device sleeve having one or more attachment mechanisms disposed therein, the one or more attachment mechanisms acting to reversibly secure an attachment portion of an accessory; and
disposing in the device sleeve an element positioned to communicate one or more of power and data with the information handling device;
wherein the one or more attachment mechanisms of the accessory bay conform with a video electronics standards association mount format.

17. The method of claim 16, further comprising:
forming another element in the base component positioned to communicate one or more of power and data with an accessory attached via the one or more attachment mechanisms.

18. The method of claim 16, further comprising:
forming in the device sleeve one or more integrated peripheral devices;
the one or more integrated peripheral devices communicating with the information handling device.

19. The method of claim 18, wherein the one or more integrated peripheral devices comprise an optical scanner and a magnetic strip reader.

20. The method of claim 16, wherein the accessory comprises one or more of a mobile power source and a securing strap.

\* \* \* \* \*